US009829208B2

(12) United States Patent
Ino et al.

(10) Patent No.: US 9,829,208 B2
(45) Date of Patent: Nov. 28, 2017

(54) OPERATING TERMINAL FOR AIR CONDITIONER

(71) Applicants: Hiroyuki Ino, Tokyo (JP); Hidetoshi Muramatsu, Tokyo (JP)

(72) Inventors: Hiroyuki Ino, Tokyo (JP); Hidetoshi Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 588 days.

(21) Appl. No.: 14/384,742

(22) PCT Filed: Jan. 9, 2013

(86) PCT No.: PCT/JP2013/050239
§ 371 (c)(1),
(2) Date: Sep. 12, 2014

(87) PCT Pub. No.: WO2013/145797
PCT Pub. Date: Oct. 3, 2013

(65) Prior Publication Data
US 2015/0032268 A1   Jan. 29, 2015

(30) Foreign Application Priority Data

Mar. 26, 2012   (JP) ................................. 2012-069888
Dec. 25, 2012   (JP) ................................. 2012-280913

(51) Int. Cl.
G05B 21/00       (2006.01)
F24F 11/00       (2006.01)
(Continued)

(52) U.S. Cl.
CPC ...... F24F 11/0009 (2013.01); F24F 11/0086 (2013.01); G05D 23/1917 (2013.01); G08C 17/02 (2013.01); F24F 2011/0068 (2013.01)

(58) Field of Classification Search
CPC .......................... F24F 11/0009; F24F 11/0086
(Continued)

(56) References Cited

U.S. PATENT DOCUMENTS 4,379,484 A * 4/1983 Lom .................... F24F 11/0009
165/251
4,939,909 A * 7/1990 Tsuchiyama ......... F24F 11/0009
361/22

(Continued)

FOREIGN PATENT DOCUMENTS

CN   101443597 B   6/2011
JP   H08-47063 A   2/1996
(Continued)

OTHER PUBLICATIONS

Hutzel, William J. "A remotely accessed HVAC laboratory for distance education." International Journal of Engineering Education 18.6 (2002): pp. 711-716.*

(Continued)

*Primary Examiner* — Satish Rampuria
(74) *Attorney, Agent, or Firm* — Posz Law Group, PLC

(57) ABSTRACT

An operating terminal that is capable of controlling an air conditioner including an indoor device and an outdoor device. The operating terminal includes a display unit that displays at least state information of an air conditioner, a memory that stores therein setting information recorded on an outdoor/indoor control substrate, a communication unit that performs information communication with the indoor device, and an information processing unit that reads setting information set in the outdoor/indoor control substrate through the communication unit, records this setting information 32a in the memory, and causes the display unit to display the setting information.

4 Claims, 7 Drawing Sheets

(51) Int. Cl.
*G08C 17/02* (2006.01)
*G05D 23/19* (2006.01)

(58) Field of Classification Search
USPC .................................................. 700/275–306
See application file for complete search history.

(56) References Cited

U.S. PATENT DOCUMENTS

| | | | | |
|---|---|---|---|---|
| 5,449,275 | A * | 9/1995 | Gluszek | F04D 27/004 236/49.3 |
| 6,546,419 | B1 * | 4/2003 | Humpleman | H04L 12/2803 348/E7.05 |
| 6,978,627 | B2 * | 12/2005 | Masui | F24F 11/006 236/51 |
| 7,043,532 | B1 * | 5/2006 | Humpleman | H04L 12/2805 709/208 |
| 7,092,794 | B1 * | 8/2006 | Hill | G08C 17/02 700/108 |
| 8,280,555 | B2 | 10/2012 | Masui et al. | |
| 2008/0236177 | A1 * | 10/2008 | Senba | F24F 11/006 62/157 |
| 2009/0281667 | A1 * | 11/2009 | Masui | F24F 11/006 700/276 |
| 2010/0070085 | A1 * | 3/2010 | Harrod | F24F 11/0086 700/276 |

FOREIGN PATENT DOCUMENTS

| | | |
|---|---|---|
| JP | 10-232041 A | 9/1998 |
| JP | 11-248234 A | 9/1999 |
| JP | 2001-160660 A | 6/2001 |
| JP | 2002-130782 A | 5/2002 |
| JP | 2003-148790 A | 5/2003 |
| JP | 2004-294029 A | 10/2004 |
| JP | 2005-079061 A | 3/2005 |
| JP | 2007-198704 A | 8/2007 |
| JP | 2007-318572 A | 12/2007 |
| JP | 2010-101578 A | 5/2010 |
| JP | 2011-247451 A | 12/2011 |

OTHER PUBLICATIONS

Agarwal, Yuvraj, et al. "Duty-cycling buildings aggressively: The next frontier in HVAC control." Information Processing in Sensor Networks (IPSN), 2011 10th International Conference on. IEEE, 2011. pp. 246-257.*
Office Action dated Jul. 8, 2015 in the corresponding Australian patent application No. 2013238606.
Extended European Search Report dated Dec. 11, 2015 in the corresponding EP application No. 3767362.0.
Office Action dated Mar. 17, 2016 issued in corresponding CN patent application No. 201310092269.2 (and English translation).
Office Action dated Sep. 6, 2016 issued in corresponding JP patent application No. 2015-018828 (and English translation).
Office Action dated Apr. 21, 2015 issued in corresponding JP patent application No. 2012-280913 (and English translation).
Office Action dated Mar. 2, 2015 issued in corresponding CN patent application No. 201310092269.2 (and English translation).
International Search Report of the International Searching Authority dated Apr. 16, 2013 for the corresponding international application No. PCT/JP2013/050239 (with English translation).
Chinese Office Action dated Sep. 22, 2015 in the corresponding Chinese application No. 201310092269.2 (Partial translation attached).
Japanese Office Action dated Sep. 1, 2015 in the corresponding Japanese application No. 2012-280913. (Partial translation attached).

* cited by examiner

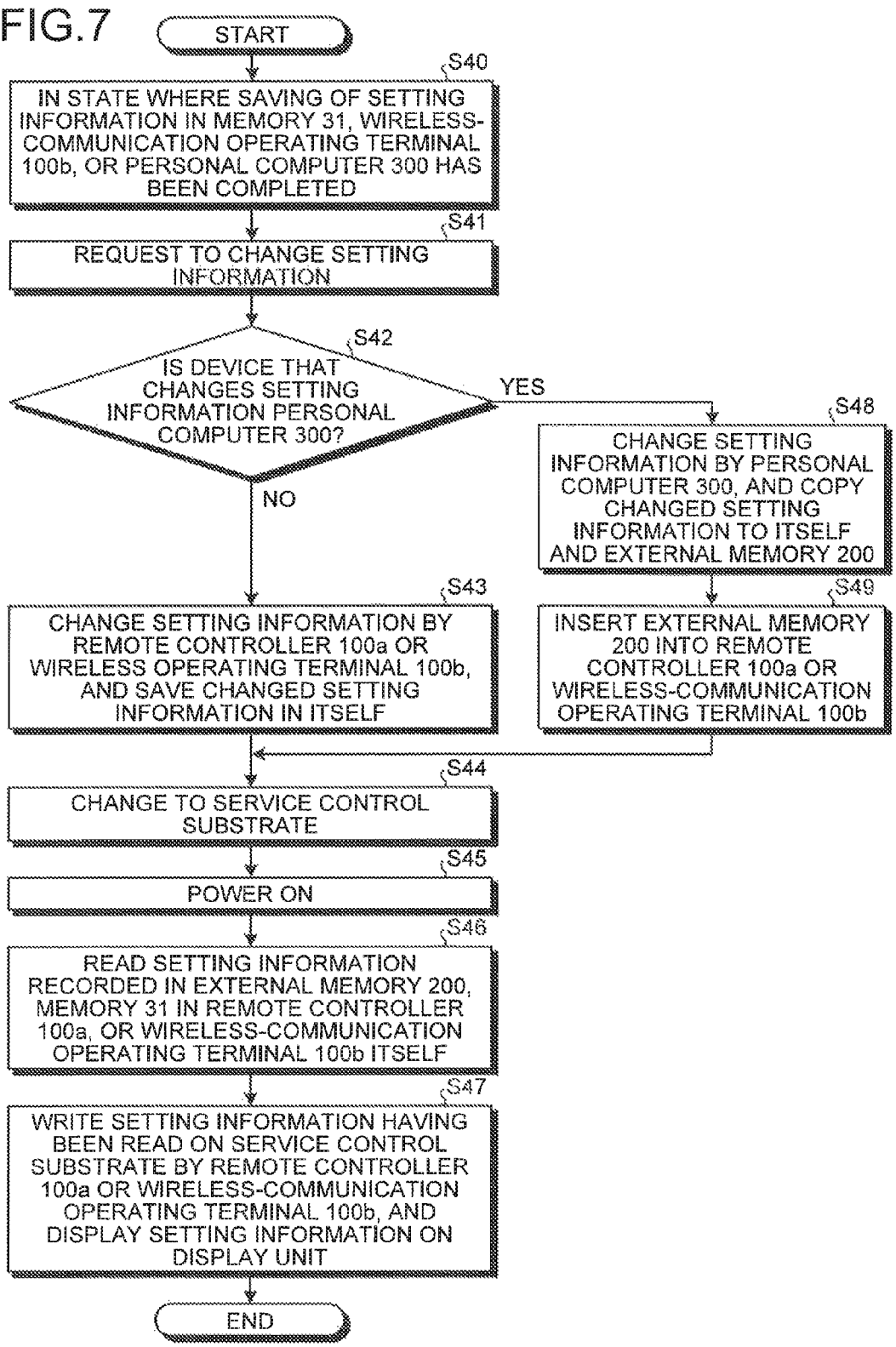

OPERATING TERMINAL FOR AIR CONDITIONER

CROSS REFERENCE TO RELATED APPLICATION

This application is a U.S. national stage application of PCT/JP2013/050239 filed on Jan. 9, 2013 and is based on Japanese Patent Application No. 2012-069888 filed on Mar. 26, 2012 and Japanese Patent Application No. 2012-280913 filed on Dec. 25, 2012, the disclosures of which are incorporated herein by reference.

FIELD

The present invention relates to an operating terminal of an air conditioner.

BACKGROUND

In a conventional air conditioner, information such as model setting and function setting (hereinafter, "setting information"), determined by a DIP switch and a jumper cut, is held in an outdoor control substrate incorporated in an outdoor device and in an indoor control substrate incorporated in an indoor device (hereinafter, "outdoor/indoor control substrate"). In a case where a fault has occurred in the conventional air conditioner as described above, after the outdoor/indoor control substrate is replaced with a service control substrate, it is necessary to set the same setting as the setting information, having been set in the outdoor/indoor control substrate, in the service control substrate through a worker's operation. Therefore, in the conventional air conditioner, there is a possibility of incorrectly setting the setting information in the service control substrate.

In order to solve the problem as described above, a typical conventional technique in Patent Literature 1 mentioned below is configured to forward the information, recorded in a remote controller, to a memory in an air-conditioning unit and record this information in the memory, when a control substrate in the air-conditioning unit is replaced.

CITATION LIST

Patent Literature

Patent Literature 1: Japanese Patent Application Laid-open No. 2007-318572

SUMMARY

Technical Problem

However, in the conventional technique in Patent Literature 1 mentioned above, a worker needs to perform a predetermined operation of the remote controller in order to confirm the setting information having been recorded on the outdoor/indoor control substrate. When the worker does not operate the remote controller, there is a possibility that the worker carries out the subsequent work (for example, setting for the service control substrate) in a state where incorrect setting information has been recorded on the outdoor/indoor control substrate. Therefore, there is a problem that additional service activities may cause work costs to increase.

The present invention has been achieved to solve the above problems, and an object of the present invention is to provide an operating terminal of an air conditioner, which can reduce work costs associated with recording setting information.

Solution to Problem

To solve the problem described above and achieve the object, the present invention is directed to an operating terminal that is capable of controlling an air conditioner including an indoor device and an outdoor device. Each of the indoor device and the outdoor device is provided with a control substrate that holds therein at least setting of functions used in the indoor device and the outdoor device as setting information. The operating terminal includes: a display unit that displays at least state information of the air conditioner; a memory that stores therein setting information recorded on the control substrate; a communication unit that performs information communication with the indoor device; and an information processing unit that reads setting information set in the control substrate through the communication unit, records this setting information in the memory, and causes the display unit to display the setting information.

Advantageous Effects of Invention

According to the present invention, setting information held in an outdoor/indoor control substrate is displayed on a display unit of an operating terminal to prompt a worker to confirm the setting information, and therefore work costs associated with recording the setting information can be reduced.

BRIEF DESCRIPTION OF DRAWINGS

FIG. 7 is a flowchart for explaining a third recording operation for the setting information.

DESCRIPTION OF EMBODIMENTS

Exemplary embodiments of an operating terminal of an air conditioner according to the present invention will be explained below in detail with reference to the accompanying drawings. The operating terminal described herein represents an air-conditioner remote controller (hereinafter, "remote controller") 100a that performs wired or wireless communication, and a wireless-communication operating terminal (hereinafter, "wireless terminal") 100b that can perform various kinds of wireless communication 14, such as a smartphone and a tablet device. The present invention is not limited to the embodiments.

Embodiment

Figure 1:
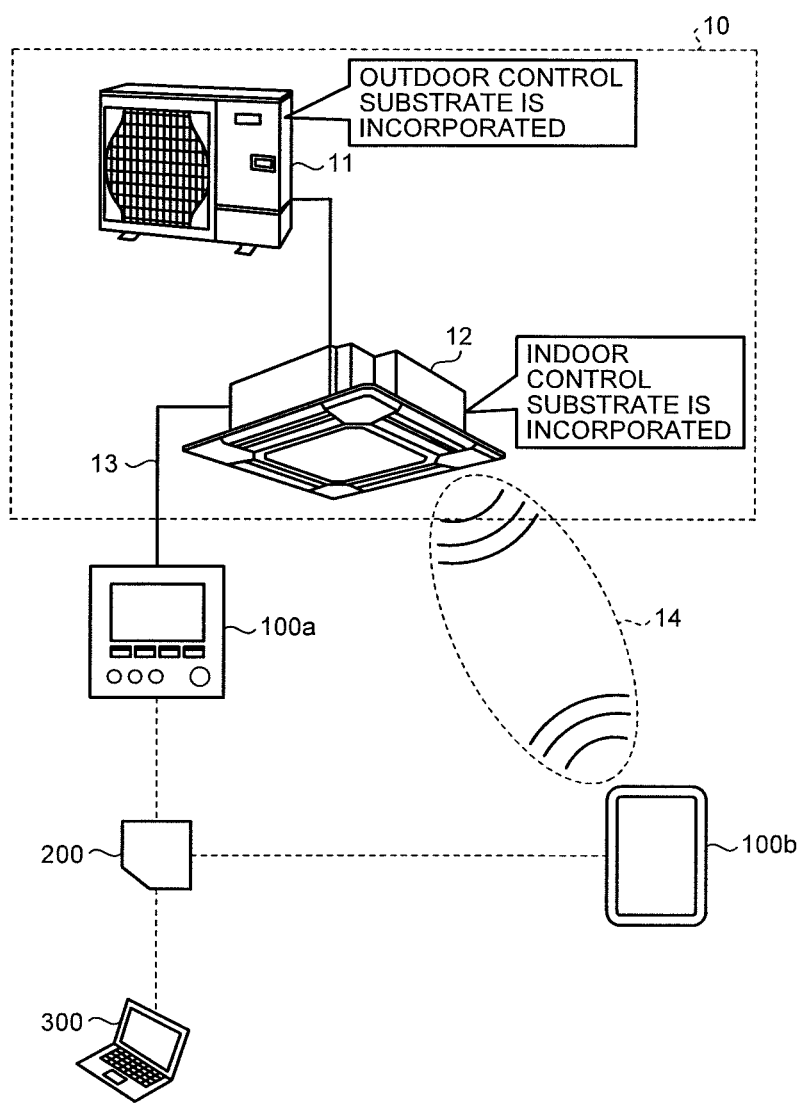
FIG. 1 is a schematic diagram of a remote controller of an air conditioner, an operating terminal, an air-conditioner main unit, an external memory, and a personal computer according to an embodiment of the present invention.

FIG. 1 is a schematic diagram of the remote controller 100a of an air conditioner, the wireless terminal 100b, an air-conditioner main unit 10, an external memory 200, and a personal computer 300 according to an embodiment of the present invention. The air-conditioner main unit 10 is configured by an outdoor device 11 and an indoor device 12. The outdoor device 11 includes a noise filter circuit, an inverter circuit that drives a fan motor, a compressor, and the like, which are installed in an outdoor device, and an outdoor control substrate on which a control circuit that controls the inverter circuit, and the like are mounted, for example. The indoor device 12 includes an indoor control substrate on which a drive circuit that drives a fan motor installed in an indoor device, and the like are mounted, for example. In the following explanations, the outdoor control substrate and the indoor control substrate are referred to as "outdoor/indoor control substrate", unless otherwise specified. Information such as model setting and function setting, determined by a DIP switch and a jumper cut, is set in the outdoor/indoor control substrate. The terminal 100b is assumed to be a device that has a dedicated function of communicating with the indoor device 12, such as a dedicated application that enables communication with the indoor device 12.

Figure 2:
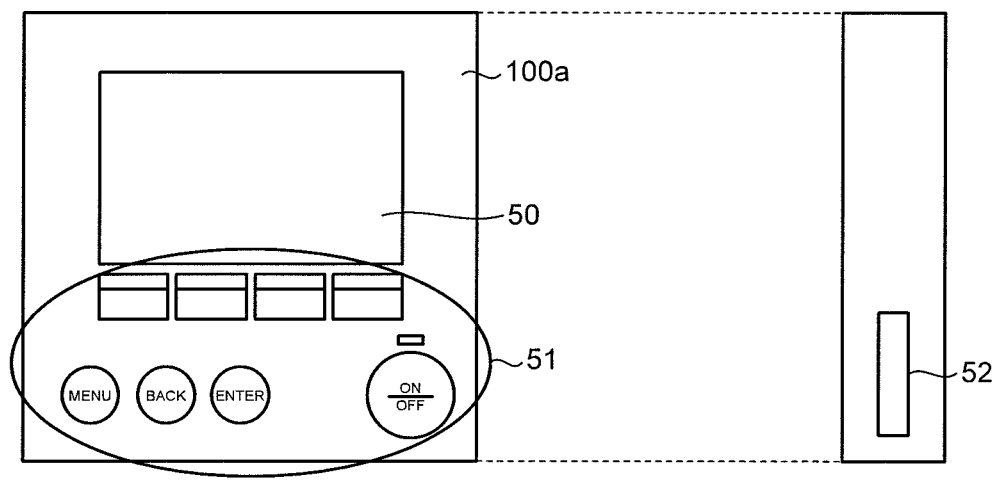
FIG. 2 is a detailed exterior view of the remote controller.
Figure 3:
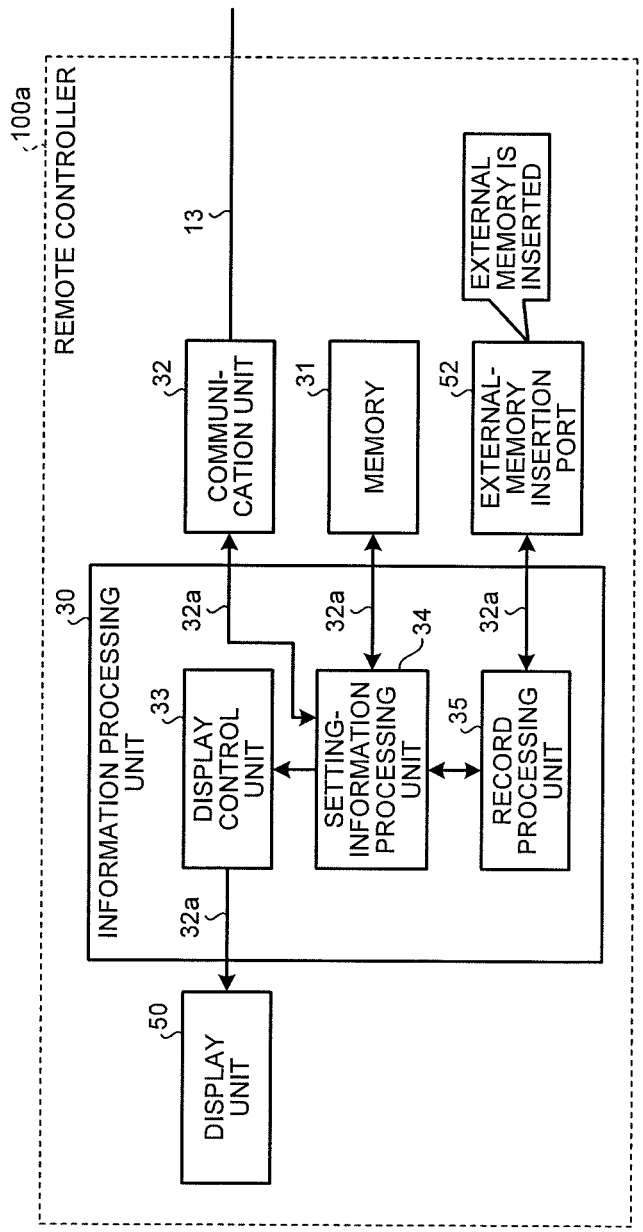
FIG. 3 is a schematic functional block diagram of the remote controller.

FIG. 2 is a detailed exterior view of the remote controller 100a. FIG. 3 is a schematic functional block diagram of the remote controller 100a. The remote controller 100a is configured to include, as its main constituent elements, an information processing unit 30 that manages an operation of the remote controller 100a, an operation unit 51 that remotely controls the driving of the air-conditioner main unit 10, a display unit 50 that displays at least state information of an air conditioner (for example, a set temperature, an indoor temperature, and a driving mode), a memory 31 that stores therein setting information 32a (model information and function setting information, which are set by a DIP switch, a jumper cut, and the like) recorded on an outdoor/indoor control substrate, an external-memory insertion port 52 through which the external memory 200 such as an SD card or a USB memory is inserted, a communication unit 32 that performs information communication with the indoor device 12, a setting-information processing unit 34, a display control unit 33, and a record processing unit 35. In the indoor device 12, a communication unit (not shown) that performs information communication with the remote controller 100a and the wireless terminal 100b is provided. Information transmission is performed between the communication unit 32 in the remote controller 100a and the communication unit in the indoor device 12 wirelessly or through a communication line 13. Information transmission is performed wirelessly between the wireless terminal 100b and the communication unit in the indoor device 12.

The setting-information processing unit 34 downloads the setting information 32a set in the outdoor/indoor control substrate, transmits the setting information 32a having been downloaded to the display control unit 33 and the record processing unit 35, and also records this setting information 32a in the memory 31. Specifically, the setting-information processing unit 34 requests a control unit (not shown) in the outdoor/indoor control substrate to transmit the setting information 32a at the first power-on after the setting information 32a is recorded on the outdoor/indoor control substrate (which can be also performed at any timing). The control unit in the outdoor/indoor control substrate, which has received this transmission request, transmits setting information set in the outdoor/indoor control substrate to the setting-information processing unit 34. The setting-information processing unit 34 transmits this setting information 32a to the display control unit 33 in order to display the setting information 32a on the display unit 50, and also records the setting information 32a in the memory 31. As described above, the setting-information processing unit 34 reads the setting information 32a recorded on the outdoor/indoor control substrate, and performs processing for displaying the setting information 32a having been read on the display unit 50, and for recording this setting information 32a in the memory 31. Further, when there is the wireless terminal 100b, the wireless terminal 100b requests the indoor device 12 to transmit the setting information 32a. Therefore, the setting information 32a can be also downloaded onto and saved in the wireless terminal 100b. A request for the control unit in the outdoor/indoor control substrate to transmit the setting information 32a can be also issued from the wireless terminal 100b at any timing based on the intention of a user or the like.

At the first power-on after the outdoor/indoor control substrate is replaced with a service control substrate, the setting-information processing unit 34 reads the setting information 32a recorded in the memory 31, and performs processing for displaying the setting information 32a having been read on the display unit 50. The reading of the setting information 32a also applies to the wireless terminal 100b, and the setting information 32a having been read is also displayed on the wireless terminal 100b. The service control substrate is a substrate on which a nonvolatile memory and the like are mounted instead of a DIP switch and a jumper, and is installed in the outdoor device 11 or the indoor device 12 instead of the outdoor/indoor control substrate.

Furthermore, when a predetermined operation is performed by the operation unit 51 after this power-on, the setting-information processing unit 34 performs processing for writing the setting information 32a read from the memory 31 on the service control substrate. Further, in the same manner as this, a predetermined operation is performed also on the wireless terminal 100b, and therefore the setting information 32a can be written on the service control substrate.

Upon reception of the setting information 32a read by the setting-information processing unit 34, the display control unit 33 visualizes and displays this setting information 32a on the display unit 50.

Upon reception of the setting information 32a read by the setting-information processing unit 34, the record processing unit 35 records this setting information 32a in the external memory 200 inserted into the external-memory insertion port 52. The setting information 32a recorded in the external memory 200 is read by the record processing unit 35 when a predetermined operation is performed by the operation unit 51. The setting information 32a having been read is written on the outdoor/indoor control substrate by the setting-information processing unit 34. Similarly, the wireless terminal 100b also displays the setting information 32a saved in itself (the wireless terminal 100b) or in the external memory 200, and can write the setting information 32a on the outdoor/indoor control substrate by preforming a predetermined operation on the wireless terminal 100b. Further, it is possible to record the setting information 32a, recorded in the external memory 200 by the remote controller 100a or the wireless terminal 100b, also to the personal computer 300. It is possible to change the setting information 32a by performing a predetermined operation on the remote controller 100a, the wireless terminal 100b, or the personal computer 300.

Figure 4:
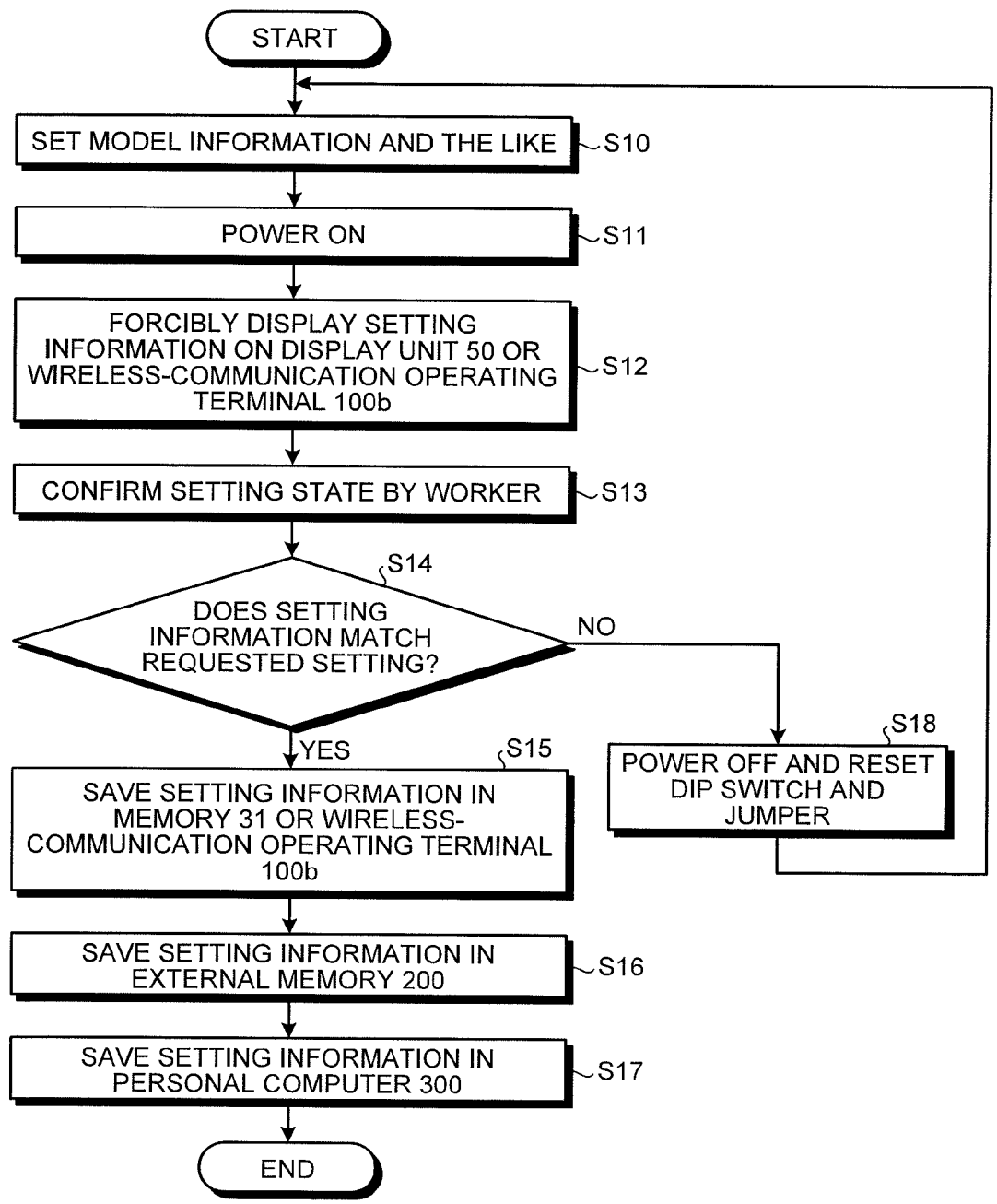
FIG. 4 is a flowchart for explaining an operation example to display setting information on a display unit in the remote controller or on a wireless-communication operating terminal.

Next, an operation is explained. FIG. 4 is a flowchart for explaining an operation example to display the setting information 32a on the display unit 50 in the remote controller 100a or on the wireless terminal 100b. In the air-conditioner main unit 10, setting of model information and the like in the outdoor/indoor control substrate is performed (Step S10). When the air-conditioner main unit 10 is powered on (Step S11), the setting-information processing unit 34 or the wireless terminal 100b downloads the setting information 32a, and the display control unit 33 displays this setting information 32a forcibly on the display unit 50 or the wireless terminal 100b (Step S12). When the setting information 32a is displayed on the display unit 50 or the wireless terminal 100b, a worker confirms whether the setting information 32a displayed thereon has been set as requested (Step S13). When the setting information 32a does not match the requested setting (NO at Step S14), the air-conditioner main unit 10 is powered OFF, information such as model setting and function setting, determined by a DIP switch and a jumper cut, is set (Step S18), and the processing at Steps S10 to S14 is repeated.

At Step S14, when the setting information 32a matches the requested setting (YES at Step S14), the setting information 32a is recorded in the memory 31 or the wireless terminal 100b (Step S15), and is further recorded in the external memory 200 and the personal computer 300 (Step S16 and Step S17).

At the first power-on after the setting information 32a is set in the outdoor/indoor control substrate, the setting information 32a is displayed on the display unit 50 in the remote controller 100a or on the wireless terminal 100b. Therefore, even when an operation is not performed by the operation unit 51 in the remote controller 100a or on the wireless terminal 100b, the setting information 32a can be confirmed. Accordingly, the worker can save the time and effort of operating the operation unit 51 in the remote controller 100a or the wireless terminal 100b, and also it is possible to prevent the subsequent work from being carried out in a state where incorrect setting information 32a has been recorded on the outdoor/indoor control substrate (for example, prevent recording of the incorrect setting information 32a to a service substrate). As a result, it is possible to achieve high efficiency of work related to installing the air-conditioner main unit 10. By providing the record processing unit 35, the setting information 32a read from the outdoor/indoor control substrate can be backed up to the external memory 200, even when the setting information 32a is lost for any reason after having been recorded in the memory 31. Further, because the setting information 32a can be also saved in the personal computer 300, it is possible to construct a database, related to setting information of an air conditioner used by a customer, on the personal computer 300, and this database can be also useful in servicing.

Figure 5:
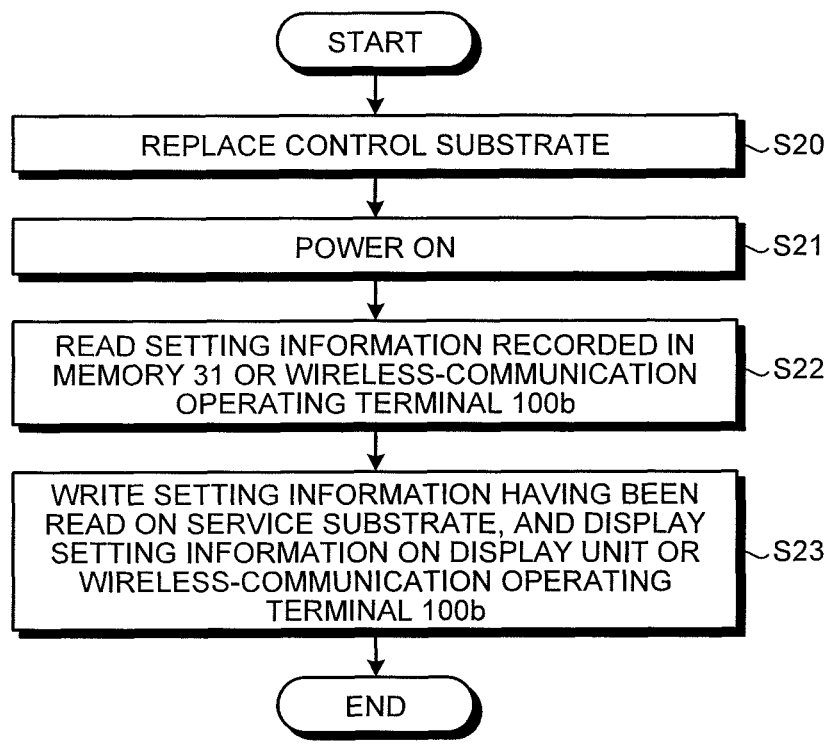
FIG. 5 is a flowchart for explaining a first recording operation for the setting information.

FIG. 5 is a flowchart for explaining a first recording operation for the setting information 32a. For example, after the setting information 32a is set in the outdoor/indoor control substrate, a fault occurs in an air conditioner, and then the outdoor/indoor control substrate is replaced with a service control substrate (Step S20). Further, when the air-conditioner main unit 10 is powered on (Step S21), the setting information 32a recorded in the memory 31 or the wireless terminal 100b is read by the setting-information processing unit 34 (Step S22). The setting information 32a having been read is displayed on the display unit 50 or the wireless terminal 100b by the display control unit 33, and is also written on the service control substrate when a predetermined operation is performed by the operation unit 51 or the wireless terminal 100b (Step S23).

Figure 6:
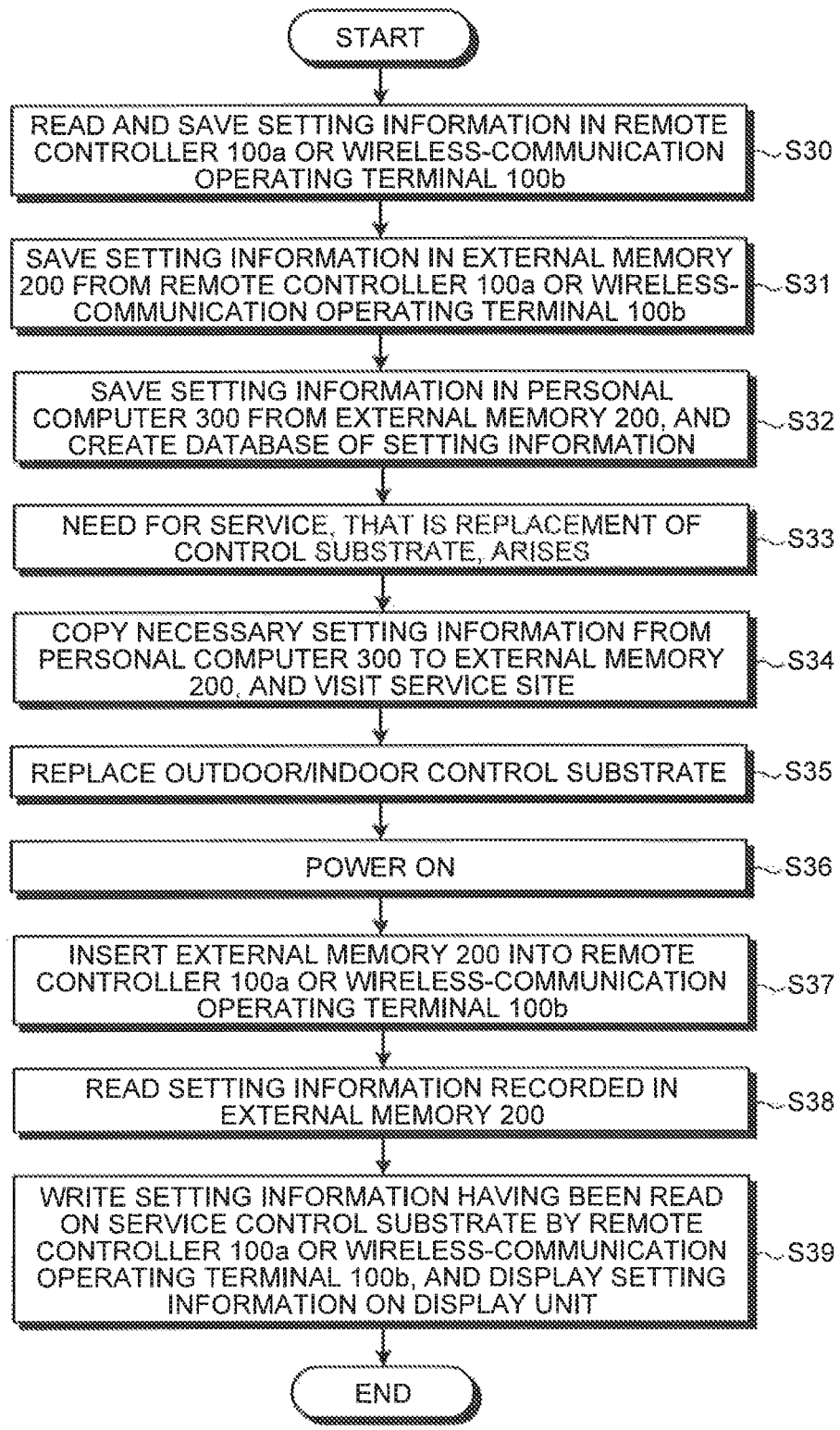
FIG. 6 is a flowchart for explaining a second recording operation for the setting information.

FIG. 6 is a flowchart for explaining a second recording operation for the setting information 32a, and depicts a recording operation for the setting information 32a in a case of coordinating with various devices such as the remote controller 100a, the wireless terminal 100b, the external memory 200, and the personal computer 300. First, a user or a serviceman uses the remote controller 100a or the wireless terminal 100b to read the setting information 32a saved in the outdoor/indoor control substrate at any timing. The setting information 32a having been read is saved in the remote controller 100a or the wireless terminal 100b (Step S30). The setting information 32a having been saved in the remote controller 100a or the wireless terminal 100b is saved also in the external memory 200 (Step S31). Further, the setting information 32a having been saved in the external memory 200 is saved in the personal computer 300 to create a database related to air-conditioner setting information for each user (Step S32). After proceeding to the status as described above, when the need for service, that is a replacement of the outdoor/indoor control substrate, arises due to a fault in the air conditioner or the like (Step S33), the user's air-conditioner setting information is copied from the personal computer 300 to the external memory 200. The serviceman takes this external memory 200 and visits a service site (Step S34). The outdoor/indoor control substrate is then replaced with a service control substrate (Step S35). Further, after the air-conditioner main unit 10 is powered on (Step S36), when the external memory 200 is inserted into the external-memory insertion port 52 in the remote controller 100a or in the wireless terminal 100b (Step S37), the setting information 32a recorded in the external memory 200 is read by the record processing unit 35 when a predetermined operation is performed by the operation unit 51 (Step S38). The setting information 32a having been read is then written on the service control substrate by the setting-information processing unit 34, and is also displayed on the display unit 50 (Step S39). At this time, writing of the setting information 32a on the outdoor/indoor control substrate can be also performed by using the wireless terminal 100b.

The setting information 32a is saved in the wireless terminal 100b or in the memory 31 in the remote controller 100a, and is then written on the service control substrate. Therefore, a worker can save the time and effort of manually setting the DIP switch and the like over again, and accordingly high servicing efficiency can be achieved. A service control substrate on which a DIP switch and the like are not mounted is used, and consequently the DIP switch and other parts become unnecessary and manufacturing costs of the service control substrate can be reduced. Also, servicing work efficiency is improved because the worker does not need to set the DIP switch and the jumper.

The setting information 32a is saved also in the external memory 200 and the personal computer 300, and therefore even when the setting information 32a recorded in the memory 31 cannot be read, it is still possible to write the setting information 32a, recorded in the external memory 200, to the service control substrate, and to write the setting information 32a, recorded in the personal computer 300, to the service control substrate via the external memory 200, and this configuration can improve the service quality.

FIG. 7 is a flowchart for explaining a third recording operation for the setting information 32a. Similarly to FIG. 6, FIG. 7 depicts a recording operation for the setting information 32a in a case of coordinating with various devices such as the remote controller 100a, the wireless terminal 100b, the external memory 200, and the personal computer 300. First, in a state where Steps S30 to S32 in FIG. 6 have been completed (Step S40), when there is a request from a user to change the setting information 32a (Step S41), and the device that changes setting information is a device other than the personal computer 300 (the remote controller 100a or the wireless terminal 100b) (NO at Step S42), the setting information 32a is changed by using the remote controller 100a or the wireless terminal 100b. The setting information 32a having been changed is saved in its own (the remote controller 100a or the wireless terminal 100b) memory (Step S43), and then the control substrate is changed to a service control substrate (Step S44).

The air-conditioner main unit 10 is powered on after the control substrate is changed to a service control substrate (Step S45). Therefore, the setting information 32a, saved in the external memory 200, the memory 31 in the remote controller 100a, or the wireless terminal 100b, is read (Step S46). This setting information 32a is written on the service control substrate, and is also displayed on the display unit 50 (Step S47).

At Step S42, when the device that changes setting information is the personal computer 300 (YES at Step S42), the setting information 32a is changed by using the personal computer 300, and the setting information 32a having been changed is saved in its own (the personal computer 300) memory or in the external memory 200 (Step S48). The external memory 200 having the changed setting information 32a saved therein is inserted into the remote controller 100a or the wireless terminal 100b (Step S49), and the control substrate is changed to a service control substrate (Step S44). With this configuration, improvement in user convenience can be also achieved.

As explained above, the operating terminal of an air conditioner according to the present embodiment is the remote controller 100a or the wireless terminal 100b that is capable of controlling an air conditioner including the indoor device 12 and the outdoor device 11. Each of the indoor device 12 and the outdoor device 11 is provided with a control substrate (an outdoor/indoor control substrate) that holds therein at least setting of functions used in the indoor device 12 and the outdoor device 11 as the setting information 32a. The operating terminal includes the display unit 50 that displays at least state information of an air conditioner, the memory 31 that stores therein setting information recorded on the outdoor/indoor control substrate, the communication unit 32 that performs information communication with the indoor device 12, and the information processing unit 30 that reads the setting information 32a set in the outdoor/indoor control substrate through the communication unit 32, records this setting information 32a in the memory 31, and causes the display unit 50 to display this setting information 32a. Therefore, even when a predetermined operation is not performed by the operation unit 51 at the first power-on after the setting information 32a is set in the outdoor/indoor control substrate, the setting information 32a can be confirmed by a worker. Further, even when a predetermined operation is not performed by the wireless terminal 100b at the first power-on after the setting information 32a is set in the outdoor/indoor control substrate, the setting information 32a can be confirmed by a worker. Therefore, even when a worker does not operate the operation unit 51, the worker can be prompted to confirm the setting information 32a held in the outdoor/indoor control substrate, and it is possible to prevent the subsequent work from being carried out in a state where the incorrect setting information 32a has been recorded on the outdoor/indoor control substrate. As a result, it is possible to achieve high efficiency of work related to installing the air-conditioner main unit 10.

The operating terminal according to the present embodiment includes the operation unit 51 that remotely controls the driving of an air conditioner. When the air conditioner is powered on, and a predetermined operation is performed by the operation unit 51, the information processing unit 30 writes the setting information 32a read from the memory 31 on a substrate (a service control substrate) used instead of the outdoor/indoor control substrate. Therefore, a worker can save the time and effort of manually setting the DIP switch and the like over again, and accordingly high servicing efficiency can be achieved. Also, the DIP switch and other parts become unnecessary, and consequently manufacturing costs of the service control substrate can be reduced.

When the air conditioner is powered on, the information processing unit 30 according to the present embodiment causes the display unit 50 to display the setting information 32a read from the memory 31. Therefore, even when a predetermined operation is not performed by the operation unit 51, the setting information 32a read from the memory 31 can be confirmed by a worker. Accordingly, a worker can be prompted to confirm the setting information 32a recorded in the memory 31 in the operating terminal, and can carry on work while again confirming the setting information 32a to be set in the service control substrate, and this configuration can improve the service quality.

In the operating terminal according to the present embodiment, the external-memory insertion port 52 is provided. The information processing unit 30 records the setting information 32a read from the outdoor/indoor control substrate in the external memory 200 inserted into the external-memory insertion port 52, and causes the display unit 50 to display this setting information 32a. Therefore, even when the setting information 32a recorded in the memory 31 is lost later for any reason, the setting information 32a can be backed up to the external memory 200. Accordingly, it is possible to improve the service quality through various methods.

When a predetermined operation is performed by the operation unit 51, the information processing unit 30 according to the present embodiment writes the setting information 32a read from the external memory 200 on the service control substrate. Therefore, the service quality can be improved, and high servicing efficiency can be also achieved.

The operating terminal of an air conditioner according to the embodiment of the present invention is only an example of the contents of the present invention. The operating terminal of an air conditioner according to the embodiment can be combined with other well-known techniques, and it is needless to mention that the present invention can be configured while modifying it without departing from the scope of the invention, such as omitting a part thereof.

INDUSTRIAL APPLICABILITY

As described above, the present invention can be applied to an operating terminal of an air conditioner, and is particularly useful as an invention that can reduce work costs associated with recording setting information.

REFERENCE SIGNS LIST 10 air-conditioner main unit, 11 outdoor device, 12 indoor device, 13 communication line, 14 wireless communication, 30 information processing unit, 31 memory, 32 communication unit, 33 display control unit, 34 setting-information processing unit, 35 record processing unit, 32a setting information, 50 display unit, 51 operation unit, 52 external-memory insertion port, 100a remote controller, 100b wireless terminal, 200 external memory, 300 personal computer.

The invention claimed is:

1. An operating terminal that is capable of controlling an air conditioner including an indoor device and an outdoor device, wherein each of the indoor device and the outdoor device is provided with a control substrate that holds therein as setting information at least settings of functions used in the indoor device and the outdoor device, the operating terminal comprising:
   an operation unit that remotely controls driving of the air conditioner;
   a display unit that displays at least state information of the air conditioner;
   a memory that stores therein the setting information recorded on the control substrate;
   a communication unit that performs information communication with the indoor device; and
   an information processing unit that downloads the setting information from the control substrate through the communication unit to forcibly allow display of the setting information on the display unit without the operation unit being operated when the air conditioner is powered on for a first time after the setting information is set in the control substrate, and records the setting information in the memory wherein:
   an external-memory insertion port is provided in the operating terminal, and the information processing unit records setting information read from the control substrate in an external memory inserted into the external-memory insertion port, and causes the display unit to display the setting information; and
   when a predetermined operation is performed by the operation unit, the information processing unit writes setting information read from the external memory on a substrate used instead of the control substrate.

2. The operating terminal of an air conditioner according to claim 1, wherein
   when the air conditioner is powered on and a predetermined operation is performed by the operation unit, the information processing unit writes setting information read from the memory on a substrate used instead of the control substrate.

3. The operating terminal of an air conditioner according to claim 2, wherein
   when the air conditioner is powered on, the information processing unit causes the display unit to display setting information read from the memory.

4. The operating terminal of an air conditioner according to claim 1, wherein
   the operating terminal changes setting information saved in its own memory or an external memory by performing a predetermined operation by the operation unit.

* * * * *